US007076554B1

(12) United States Patent
Kobayashi (10) Patent No.: US 7,076,554 B1
(45) Date of Patent: Jul. 11, 2006

(54) INTERNET SERVICE TELEPHONE COMMUNICATION CONNECTION METHOD

(75) Inventor: Yoshikazu Kobayashi, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 482 days.

(21) Appl. No.: 09/589,084

(22) Filed: Jun. 8, 2000

(30) Foreign Application Priority Data

Jun. 11, 1999 (JP) .................................. 11/164984

(51) Int. Cl.
*G06F 15/16* (2006.01)
*H04L 12/66* (2006.01)
*H04M 3/42* (2006.01)

(52) U.S. Cl. ....................... 709/227; 709/204; 709/205; 709/237; 709/245; 370/352; 379/202.1

(58) Field of Classification Search ................ 370/522, 370/352, 354, 356, 357, 401; 379/93, 382, 379/399; 709/227, 204, 205, 237, 245
See application file for complete search history.

(56) References Cited

U.S. PATENT DOCUMENTS

| 4,740,963 | A | * | 4/1988 | Eckley | ...................... | 370/522 |
| 5,905,794 | A | * | 5/1999 | Gunn et al. | .................. | 379/382 |
| 5,907,547 | A | * | 5/1999 | Foladare et al. | ............ | 370/352 |
| 5,916,302 | A | * | 6/1999 | Dunn et al. | .................. | 709/204 |
| 5,995,608 | A | * | 11/1999 | Detampel et al. | ....... | 379/205.01 |
| 6,021,184 | A | * | 2/2000 | Yoshikawa | ................ | 379/93.09 |
| 6,078,579 | A | * | 6/2000 | Weingarten | ................. | 370/352 |
| 6,097,804 | A | * | 8/2000 | Gilbert et al. | ............... | 379/230 |
| 6,137,792 | A | * | 10/2000 | Jonas et al. | .................. | 370/354 |
| 6,167,043 | A | * | 12/2000 | Frantz | ........................ | 370/356 |
| 6,195,357 | B1 | * | 2/2001 | Polcyn | ....................... | 370/401 |
| 6,222,859 | B1 | * | 4/2001 | Yoshikawa | .................. | 370/522 |
| 6,240,179 | B1 | * | 5/2001 | Balatoni et al. | ....... | 379/399.02 |
| 6,324,579 | B1 | * | 11/2001 | Bleuse et al. | ............... | 709/227 |
| 6,366,654 | B1 | * | 4/2002 | Cramer et al. | ........... | 379/93.09 |
| 6,385,191 | B1 | * | 5/2002 | Coffman et al. | ............ | 370/352 |
| 6,404,873 | B1 | * | 6/2002 | Beyda et al. | ........... | 379/202.01 |
| 6,424,648 | B1 | * | 7/2002 | Ng et al. | ..................... | 370/352 |
| 6,430,178 | B1 | * | 8/2002 | Yahiro | ........................ | 370/356 |
| 6,445,697 | B1 | * | 9/2002 | Fenton | ....................... | 370/357 |
| 6,445,784 | B1 | * | 9/2002 | Uppaluru et al. | ...... | 379/220.01 |

(Continued)

FOREIGN PATENT DOCUMENTS

JP           10-322391            12/1998

OTHER PUBLICATIONS

Daniele Rizzetto et al. A voice over IP service architecture for integrated communications. May/Jun. 1999. IEEE p. 53-62.*

(Continued)

*Primary Examiner*—Ayaz Sheikh
*Assistant Examiner*—Christian LaForgia
(74) *Attorney, Agent, or Firm*—Foley & Lardner LLP (57) ABSTRACT

First and second telephone sets each comprise telephone set control units, voice codecs, and accumulating units. When the first telephone set, which is a subscriber of an internet service provider network, sends out internet service connection point data to the second telephone set, the second telephone set connects itself to the internet service provider network with reference to data in its accumulating unit and starts the voice codec. Then, the first telephone set connects itself to the internet service provider network and starts the voice codec. Thus, internet service telephone communication is made.

18 Claims, 4 Drawing Sheets

U.S. PATENT DOCUMENTS

| | | | |
|---|---|---|---|
| 6,453,034 B1 * | 9/2002 | Donovan et al. | 379/220.01 |
| 6,493,447 B1 * | 12/2002 | Goss et al. | 379/265.09 |
| 6,594,257 B1 * | 7/2003 | Doshi et al. | 370/352 |
| 6,594,269 B1 * | 7/2003 | Polcyn | 370/401 |
| 6,628,617 B1 * | 9/2003 | Karol et al. | 370/237 |
| 6,628,767 B1 * | 9/2003 | Wellner et al. | 379/202.01 |
| 6,636,508 B1 * | 10/2003 | Li et al. | 370/389 |
| 6,654,815 B1 * | 11/2003 | Goss et al. | 709/248 |
| 6,671,356 B1 * | 12/2003 | Lewis | 379/88.13 |
| 6,690,654 B1 * | 2/2004 | Elliott et al. | 370/260 |
| 6,707,827 B1 * | 3/2004 | Shaffer et al. | 370/493 |
| 6,754,708 B1 * | 6/2004 | Sabatier et al. | 709/227 |
| 6,819,663 B1 * | 11/2004 | Komuro | 370/352 |
| 6,847,632 B1 * | 1/2005 | Lee et al. | 370/352 |
| 6,912,577 B1 * | 6/2005 | Sabatier et al. | 709/227 |

OTHER PUBLICATIONS

Bill Goodman et al. Internet Telephony and Modem Delay. May/Jun. 1999. IEEE. p. 8-16.*

* cited by examiner

INTERNET SERVICE TELEPHONE COMMUNICATION CONNECTION METHOD

BACKGROUND OF THE INVENTION

The present invention relates to an internet communication system or an internet service telephone communication method, and more particularly to a telephone system through an internet telephone by a provider on a calling side.

Japanese Patent Laid-Open No. No. 10-322391 discloses an example of the prior art internet service telephone communication connection method. In the disclosed communication terminal and communication method, when a calling terminal intends to make internet service communication, it sends out data including its own IP address in the internet service network via a separate line. A called terminal receiving the data including the IP address sent out from the calling terminal, connects itself to the internet service network, and the calling terminal also connects itself thereto. Thus, terminal-to-terminal communication is made possible.

In the prior art, an internet service telephone set is connected to the own access point of its own subscribed internet service provider network to obtain the service with internet service telephone software annexed to a personal computer. However, the prior art internet service telephone communication has the following problems.

In the above prior art example, the internet service providers, which the calling and called sides are subscribers of, are indefinite. Therefore, it is impossible to ensure a sufficient service quality.

In order to secure sufficient internet service telephone communication quality, both the calling and called sides may be interconnected via the same internet service provider network. In this case, it is possible to reduce the service quality deterioration due to different internet service providers. However, where each terminal as opposite side of communication is a subscriber of a peculiar provider, it is necessary to conclude contracts with a plurality of different providers. Consequently, the contract expenditures are increased. This is undesired from the standpoint of reducing the internet service telephone communication expenditures.

SUMMARY OF THE INVENTION

An object of the present invention is to provide an internet service telephone set capable of providing internet service telephone communication via the same internet service provider network.

According to a first aspect of the present invention, there is provided a telephone communication system comprising a public network, an internet service provider network and a plurality of telephone sets accommodated in the public network, wherein when a calling telephone set as an internet service provider network subscriber provides connection point data for making internet service telephone communication to a called telephone set via a public network, the called telephone set receiving the connection point data connects itself to an internet service provider network according to the connection point data, and then the calling telephone set connects itself to the internet service provider network.

According to a second aspect of the present invention, there is provided a telephone communication system comprising a public network, an internet service provider network and a plurality of telephone sets accommodated in the public network, wherein when a calling telephone set as an internet service provider network subscriber provides connection point data for making internet service telephone communication to a called telephone set via a public network, the called telephone set receiving the connection point data connects itself to an internet service provider network according to the connection point data, and then the calling telephone set connects itself to the internet service provider network, the connection point data including at least an IP address in the internet service provider network and the telephone number of a point to be connected to the internet service provider network.

According to a third aspect of the present invention, there is provided a telephone communication system comprising a public network, an internet service provider network and a plurality of telephone sets accommodated in the public network, wherein when a calling telephone set as an internet service provider network subscriber provides connection point data for making internet service telephone communication to a called telephone set via a public network, the called telephone set receiving the connection point data connects itself to an internet service provider network according to the connection point data, and then the calling telephone set connects itself to the internet service provider network, the connection point data including at least an IP address in the internet service provider network and the telephone number of a point to be connected to the internet service provider network, a push-button telephone set having various function keys being provided between each of the plurality of telephone sets and the public network with a function of sending out a call from each telephone set.

The functions of each telephone set are executed on a personal computer. The functions of each telephone set are executed with an IVR (interactive voice response unit or a facsimile data server or a voice recognition dialer or a voice mail.

The telephone set comprises: a ten-key unit having dial keys and a function key for indicating an internet telephone service; a display unit for displaying a call arrival notification and results of various processes in the telephone set; an accumulating unit for storing telephone number data and access identifier data of internet connection points to be connected by the calling and called sides; a voice codec to be started by a command for voice communication in the internet; and a telephone set control unit for detecting depressed push-buttons in the ten-key unit, obtaining the connection point data from the accumulating unit, sending out dial data and connection point data via the public network, starting the voice codec when the dialed side has been connected to the internet service provider network and, upon arrival of a call, retrieving for the connection point data of the calling side, effecting connection of the own side to the internet service provider network by retrieving and referring to the accumulating unit according to the connection point data and informing the calling side of the connection.

Each telephone set further comprises an enciphering unit for permitting exchange of connection point data in terms of ciphers.

According to a fourth aspect of the present invention, there is provided an internet communication method comprising steps of: in response to provision, by a calling telephone set as an internet service provider network subscriber, of connection point data for making internet service telephone communication to a called telephone set via a public network, the called telephone set receiving the connection point data connects itself to an internet service provider network on the basis of the connection point data, and then the calling telephone set connects itself to the internet service provider network.

According to a fifth aspect of the present invention, there is provided an internet communication method comprising steps of: in response to provision, by a calling telephone set as an internet service provider network subscriber, of connection point data for making internet service telephone communication to a called telephone set via a public network, the called telephone set receiving the connection point data connects itself to an internet service provider network on the basis of the connection point data, and then the calling telephone set connects itself to the internet service provider network, the connection point data including at least an IP address in the internet service provider network and the telephone number of a point to be connected to the internet service provider network.

According to a sixth aspect of the present invention, there is provided an internet communication method comprising steps of: in response to provision, by a calling telephone set as an internet service provider network subscriber, of connection point data for making internet service telephone communication to a called telephone set via a public network, the called telephone set receiving the connection point data connects itself to an internet service provider network on the basis of the connection point data, and then the calling telephone set connects itself to the internet service provider network, the connection point data including at least an IP address in the internet service provider network and the telephone number of a point to be connected to the internet service provider network, a push-button telephone set having various function keys being provided between each of the plurality of telephone sets and the public network with a function of sending out a call from each telephone set.

In the present invention, in order to guarantee the service quality, an ablet (i.e., execution module having one time log-in identifier, pass word and dial-up and opposite side address data) is provided, which sends out, to the opposite side of communication, a means for permitting the opposite side to call back in internet service telephone communication to the VPN (virtual private network) of its own subscribed provider.

According to the present invention, in addition to the feature of cheap communication fee of internet service telephone communication, internet service telephone communication is permitted by guaranteeing the sound quality, i.e., service quality as the service of the VPN of the own subscribed provider.

Other objects and features will be clarified from the following description with reference to attached drawings.

PREFERRED EMBODIMENTS OF THE INVENTION

Preferred embodiments of the present invention will now be described with reference to the drawings.

An embodiment of the present invention will now be described with reference to FIG. 1. The Figure shows the construction of the embodiment of the telephone communication system according to the present invention.

Figure 1:
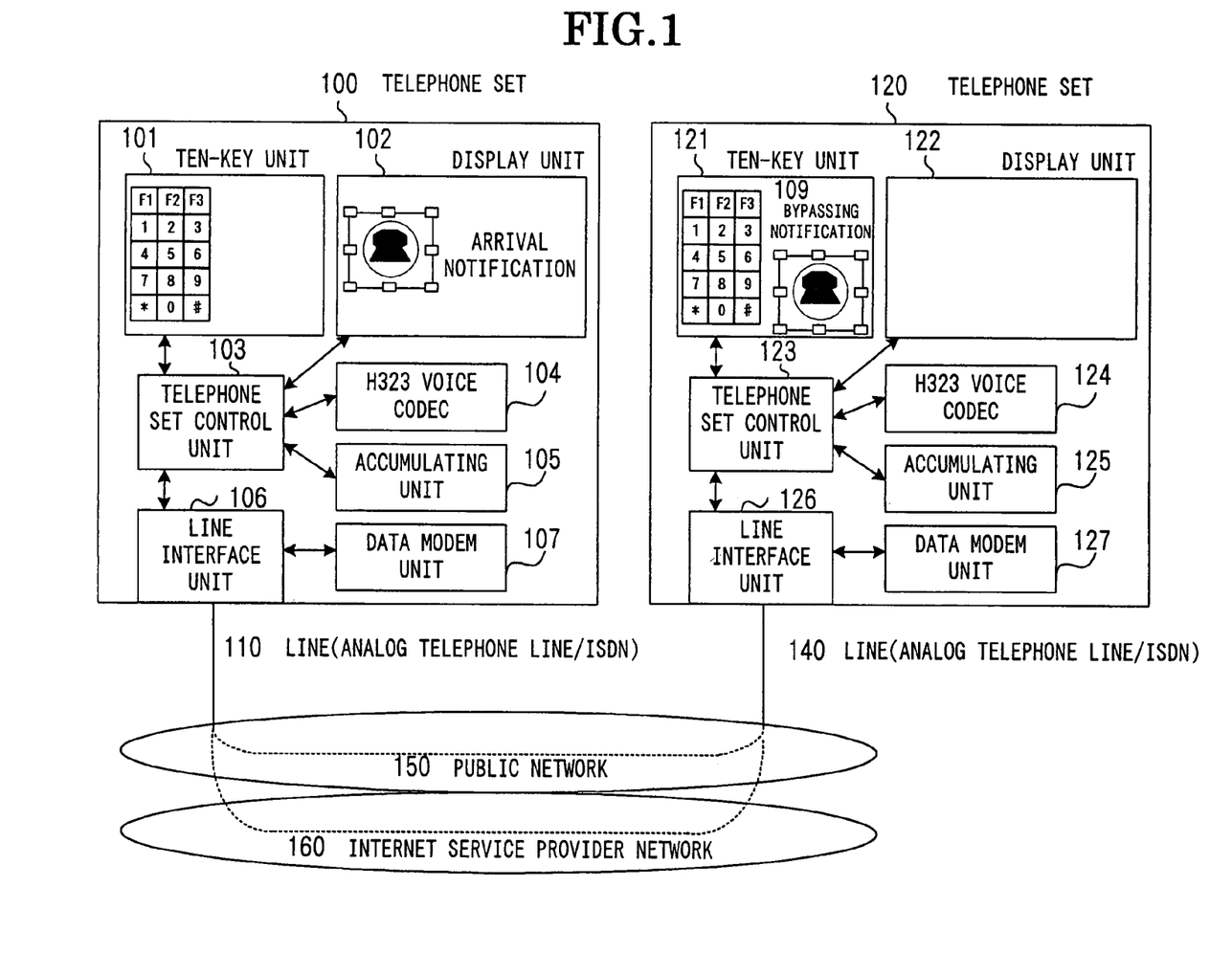
FIG. 1 is a construction of an embodiment of the telephone communication system according to the present invention.

As shown in FIG. 1, telephone sets 100 and 120 according to the present invention can make telephone communication via a public line and bypass the line for internet service telephone communication in a simple procedure.

The telephone sets 100 and 120 are connected to lines 110 and 140, respectively, which can be interconnected via a public network 150 or an internet service provider network 160. The public network 150 includes LAN, general public network and mobile communication network.

The telephone sets 100 and 120 comprise ten-key units 101 and 121, display units 102 and 122, telephone set control units 103 and 123, "H323", voice codecs 104 and 124, accumulating units 105 and 125, line interface units 106 and 126 and data modem units 107 and 127, respectively.

The ten-key units 101 and 121 each have keys of numerals "0" to "9" and marks "*" and "#" and other function keys, and can notify telephone number and bypassing and also make other notifications. The display units 102 and 122 each can display call arrival notification and results of processing in the own telephone set. The units 101 and 121 each have a bypassing notification push-button 109 for commanding the start of internet service telephone communication.

The telephone set control units 103 and 123 each send out dial data when detecting the depressed push-buttons in each of the ten-key units 101 and 121. When detecting bypassing, the units 103 and 123 each obtain data for bypassing line for internet service from each of the accumulating units 105 and 125, and send out the dial data and connection point data to each of the line interface units 106 and 126. When obtaining caller identifier and subaddress signal from each of the data modem units 107 and 127 upon call arrival, the units 103 and 123 each notify internet telephone call arrival by obtaining the data from each of the accumulating units 105 and 125, and start internet service telephone communication.

Upon receipt of command from each of the telephone set control unit 103 and 123, the "H323" voice codecs 104 and 124 are each started, whereby the lines 110 and 140 are interconnected for internet service voice communication. In the accumulating units 105 and 125, telephone number and access identifier data representing the internet service connection point to be connected by the called side and that to be connected by the calling side are stored, respectively.

The line interface units 106 and 126 each receiving dial data from each of the telephone set control units 103 and 123, make a call to the public network and the internet service provider network via each of the data modem units 107 and 127, and when detecting the call arrival from the public network, they each serve as voice and data communication interface. The units 106 and 126 each transmit subaddress signal, which is obtained by adding caller identifier to internet service connection point data, via each of the data modem units 107 and 127.

The data modem units 107 and 127 each relay communication between the line and each of the line interface units 106 and 126, analyze the caller identifier detected in each of the line interface units 106 and 126, and send out the analyzed caller identifier to each of the telephone set control units 103 and 123.

The operation of this embodiment of the present invention will now be described. In this embodiment, it is assumed that the telephone set 120 is the transmitting side, and the other telephone set 100 is the receiving side.

The calling person on the side of the telephone set 120 makes dialing by operating dial push-buttons in the ten-key unit 121. Specifically, the calling person depresses the bypassing notification push-button 109, and then dials the telephone number of the called side.

Detecting the key operation in the ten-key unit 121, the telephone set control unit 123 controls the line interface 126 for sending out the dial number of the called side. Detecting the depression of the bypassing notification push-button 109, the unit 123 retrieves the accumulating unit 125 to call out the telephone number and access identifier as the connection point data to be connected by the called side for internet service telephone communication. The telephone set control unit 123 notifies the called-out connection point data to the line interface unit 126.

The line interface unit 126 sends out the connection point data notified by the telephone set control unit 123 as subaddress signal obtained by adding the caller identifier to the called side dial number via the data modem unit 127.

Detecting the call arrival in the line interface unit 106, the telephone set 100 analyzes the caller identifier in the data modem unit 107. The line interface unit 106 notifies the call arrival and the caller identifier data to the telephone set control unit 103.

The telephone set control unit 103 compares the caller identifier received from the line interface unit 106 and the data from the accumulating unit 105 to check whether the numeral figure of a predetermined connection point data format and that of the subaddress signal with the caller identifier are identical. When it is proved as a result of the check that the two numeral figures are identical, the telephone set control unit 103 causes the accumulating unit 105 to preserve the connection point data and also causes the display unit 105 to display the arrival of the internet service telephone communication request. The display unit 102 displays the notification of the arrival of the internet service telephone communication request.

In response to the request arrival notification, the called person depresses an internet service telephone communication start push-button in the ten-key unit 101. Detecting the depression of the internet service telephone communication start push-button in the ten-key unit 101, the telephone set control unit 103 calls out the connection point data, having been sent out from the calling person side, from the accumulating unit 105, and commands transmission to the dial number in the connection point data, thus effecting connection to the access point line.

The telephone set control unit 103 sends out verification of identifer with access point via the data modem unit 107 according to the connection point data. After completion of the verification of identifier with access point, the telephone set control unit 103 starts the "H323" voice codec 104 as internet service voice codec. In this way, the telephone set 100 is connected to the line 110 (i.e., VPN of the internet service provider network 160).

In the telephone set 120, the telephone set control unit 123 detects the connection point data send-out verification from the line interface unit 126, obtains preliminarily registered internet service connection point data of the telephone set 120 from the accumulating unit 127, and dials the connection point via the line interface unit 126.

The telephone set control unit 123 sends out the verification of identifier with access point via the data modem unit 127 according to the connection point data. After completion of the verification of identifier with access point, the telephone set control unit 123 starts the "H323" codec as internet voice codec, thus connecting the telephone set 120 to the line 140 (i.e., VPN of the internet service provider network 160).

The data which are provided in the connection point data, are not limited to the telephone number to be dialed up by the opposite side set and the identifier code at that access point, but the connection point data may also include other internet service telephone communication data, such as nickname as the internet service telephone set, main address, IP address and gate keeper data.

Where the telephone number or the like is obvious and need not be sent out, such data may be left out. Also, the caller identifier is by no means limitative as the data to be added to the connection point data; for example, it is possible to add ISDN D-channel bucket or user-to-user data or, in case of "H323" telephone service defined by ITU-T, add as electronic mail or data terminal file.

Furthermore, the present invention is applicable not only to the connection to an internet service network managed by a provider but also to internet service telephone sets in self-managing network WAN or in-premise AN. The present invention is further applicable not only to internet service telephone sets but also meeting telephone sets utilizing an internet service line or television meeting sets.

As has been shown, the telephone sets 100 and 120 according to the present invention can make internet service telephone communication between them with the connection of their "H323" codecs 104 and 124 to VPN of the internet service provider network 160. That is, the telephone set 120 (i.e., the calling side) permits connection of the telephone set 100 (i.e., the called side) having no contract regarding VPN subscribed by it thereto by first connecting itself thereto and then sending out contract data to the telephone set 100. In this way, the calling and called sides can make mutual internet service telephone communication without contract with any common provider but by utilizing a single provider on a quality-guaranteed internet service line (such as VPN line or Qos guarantee line).

In this way, the present invention permits high speech quality internet service telephone communication. Also, the telephone set according to the present invention can preclude contract expenditure increase due to a plurality of provider contracts effected by a plurality of opposite side telephone sets and burden increase in view of expenditures and operation steps of management and maintenance due to the plurality of contracts.

Figure 2:
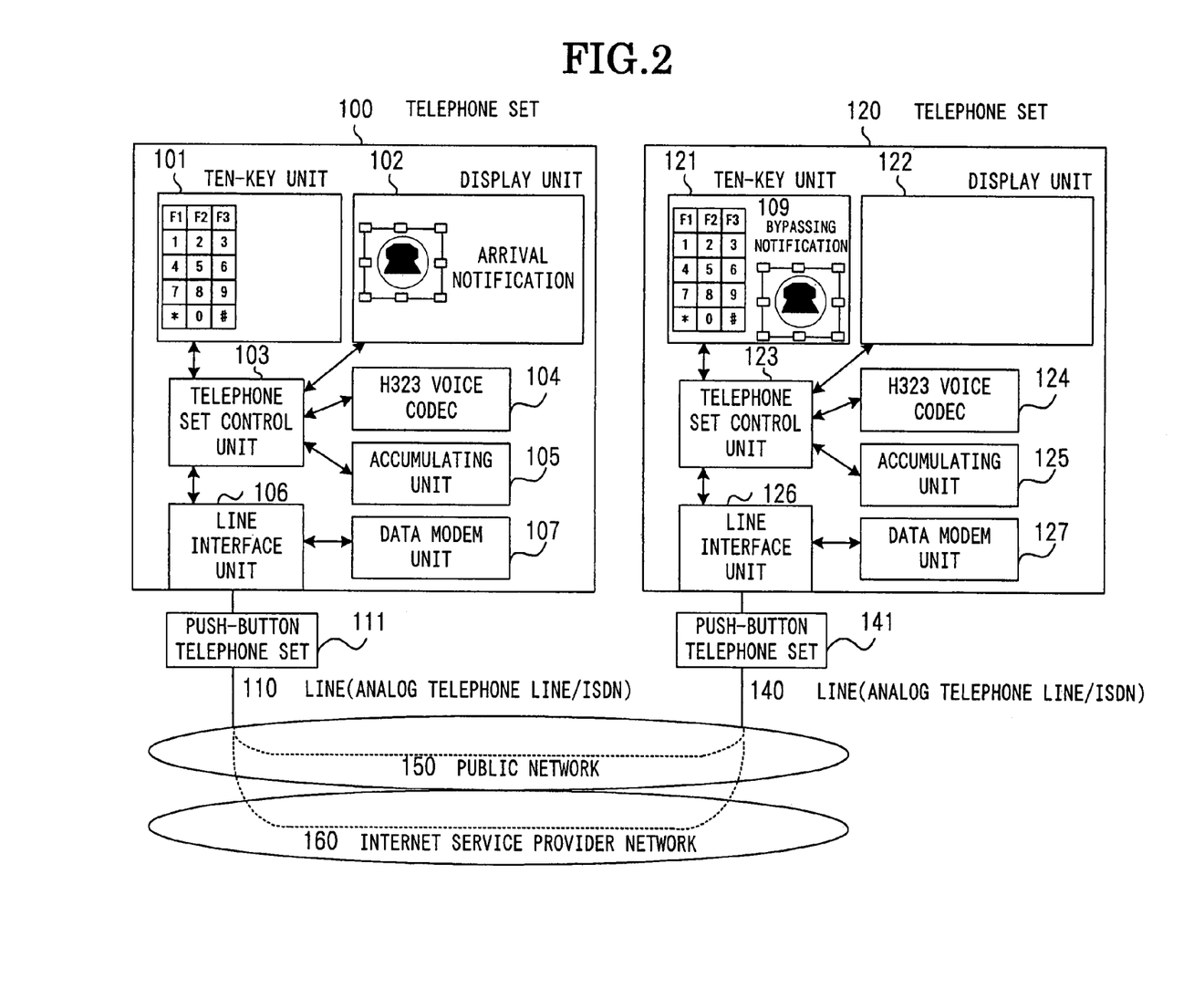
FIG. 2 is a construction of another embodiment of the telephone communication system according to the present invention.

A different embodiment of the present invention will now be described with reference to FIG. 2. FIG. 2 shows the different embodiment of the telephone set according to the present invention. The preceding embodiment of the telephone set is an internet service telephone set as independent telephone set.

In this embodiment, as shown in FIG. 2, push-button telephone sets 111 and 141 are connected to telephone sets 100 and 120, respectively. The telephone sets 111 and 141 are to be connected via lines 110 and 140, respectively, to a public network 150 and an internet service provider network 160. The telephone sets 111 and 141 are not limited to independent telephone sets or in-premise switching system terminals; for example, they may be constructed as switching system. Furthermore, the telephone sets 111 and 141 are not limited to analog telephone sets; for example, they may be ITU-T "H323" terminals, ISDN terminals, telephone sets for cable modems and so forth.

Figure 3:
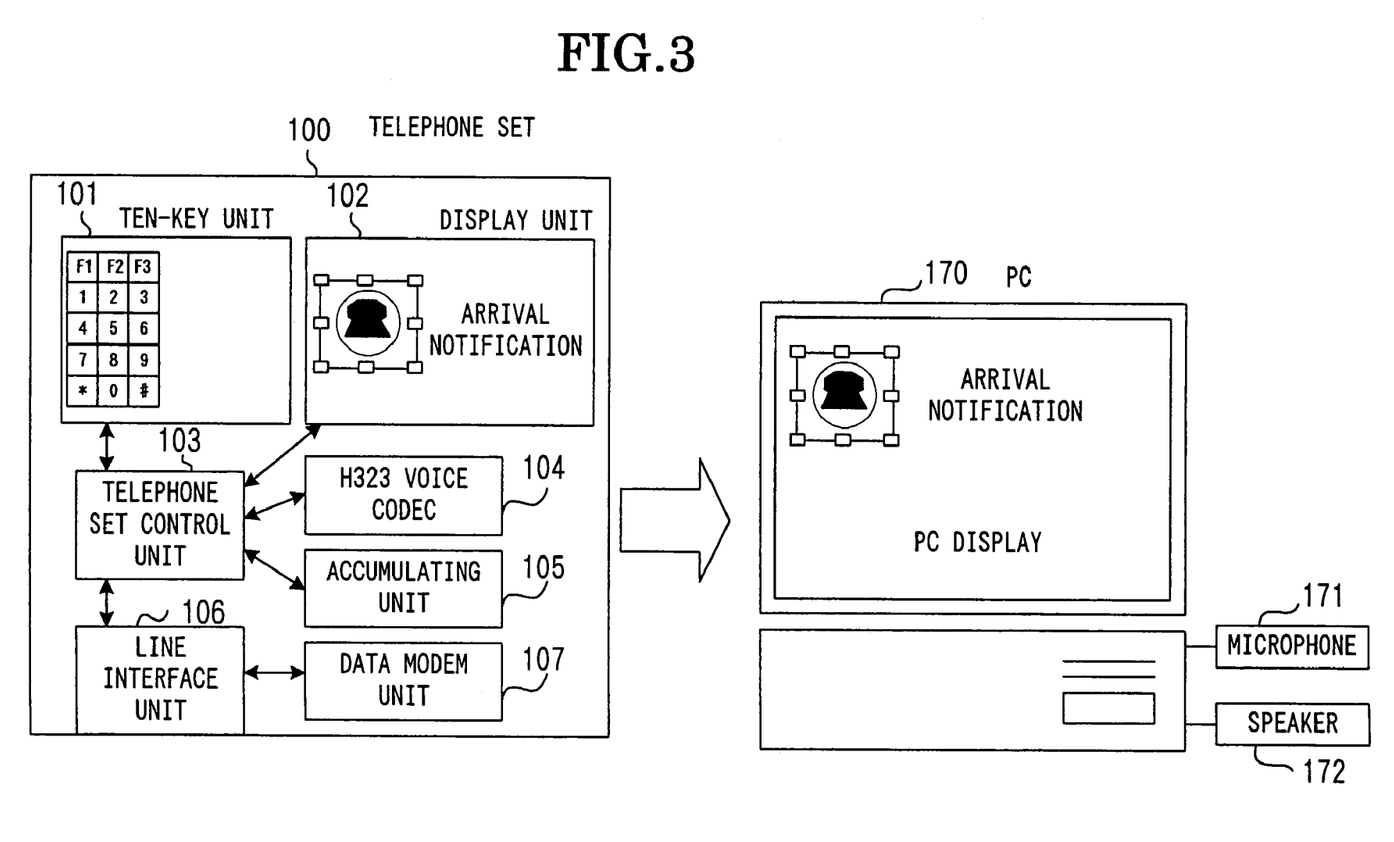
FIG. 3 is a view showing the realization of the telephone set according to the present invention on a personal computer.
Figure 4:
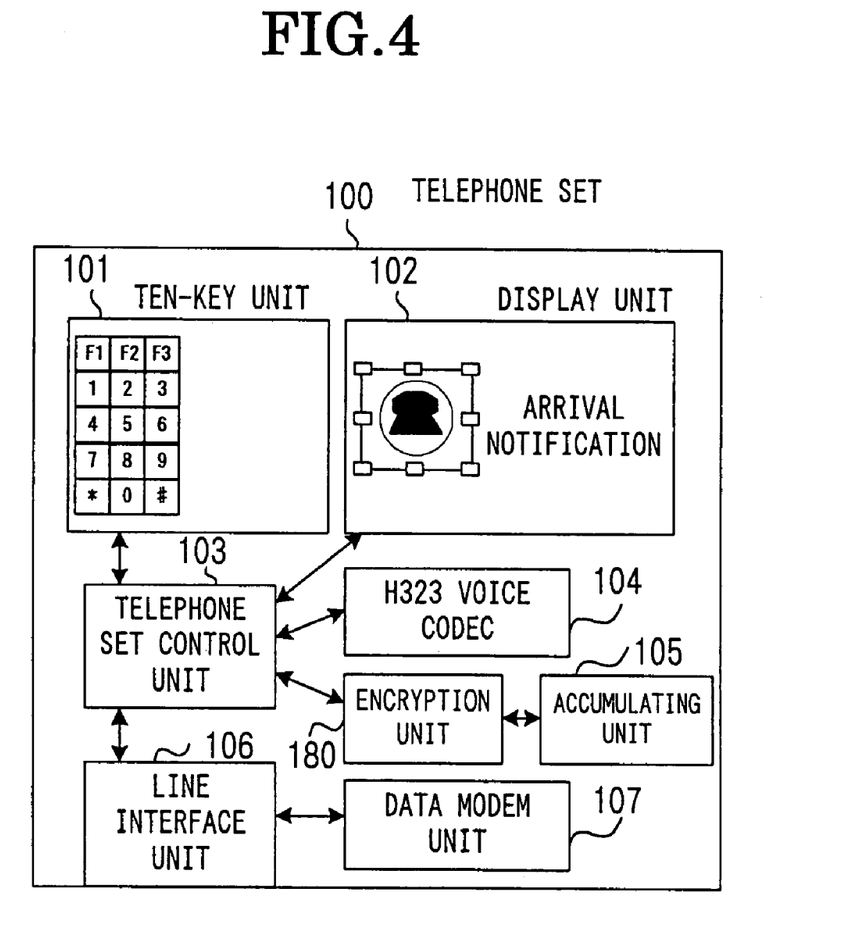
FIG. 4 is a view showing a telephone set according to the present invention, in which an encryption unit is additionally provided.

FIGS. 3 and 4 will now be referred to. FIG. 3 is a view showing the realization of the telephone set according to the present invention on a personal computer. FIG. 4 is a view showing a telephone set according to the present invention, in which an encryption unit is additionally provided.

The telephone set according to the present invention is not limited to an exclusive communication unit. As shown in FIG. 3, it is possible to realize as the telephone set on a personal computer. In FIG. 3, it is shown that it is displayed on a personal computer display screen that connection point data has been received. The user of the personal computer realizes the internet service telephone set with a microphone 171 and a loud-speaker 172 of a PC unit 170 by selecting icon with a mouth and dialing up the designated access point. The icon on the personal computer may be displayed in a browser in a receiving side personal computer, or it may be on a transmitting side web page.

The data on the web may not only be mere dial data of the access point and identifier for verification, but may also be data of ablet type (i.e., execution type) such as JAVA ablet accompanied by a telephone call producing operation. Aside from the JAVA ablet, the data may be of execution type via standard API in a data terminal. Files of the execution type via the standard API are not limited to operations in the browser. In execution type on the PC unit 170, it is possible to provide the convenience that the communication is obtainable with the sole click operation of the icon.

In the telephone set shown in FIG. 4, an encyphering unit 108 is provided for sending out the caller identifier and telephone number. With the encyphering unit 180, it is possible that the opposite side of communication or the third party is unable to understand or recognize the sent-out data. It is also possible to prohibit re-uses of the transmission data by encyphering. It is further possible to permit one time right to be maintained until the establishment of communication, so that re-transmission is possible at the time of failure of communication.

In this embodiment, the terminal of internet service telephone communication is constituted by a telephone set and a personal computer. The terminal may also be IVR (Interfactive Voice Response unit), facsimile data server, voice recognition dialer or voice mail.

In an embodiment with an IVR, a voice message such as "where to connect ?" is given upon reception of a call arrival notification. By giving a command to such a message, an internet service connection is made for communication. A facsimile data server can make a call to, for instance, a personal computer, and connect itself to an internet network for communication to obtain catalogue or like data. A voice recognition dialer or a voice mail can also be used likewise. Furthermore, it is possible to make a communication by the internet connection by the terminal with the intelligence function.

With the telephone set according to the present invention, the calling side can make internet service telephone communication with the called side with good service quality guaranteed by the internet service provider so long as it is subscribed thereto. The calling side need not be subscribed to the same provider.

In other words, the calling and called sides may be subscribers of different internet service providers, and internet service telephone communication with a plurality of terminals as opposite side of communication may be made without need of concluding contracts with the providers subscribed by the respective terminals. This means that it is possible to preclude contract expenditure increase due to contracts with a plurality of providers subscribed by respective terminals as opposite side of communication and also burden increase in the expenditures and steps of management and maintenance due to the plurality of contracts.

Furthermore, since the calling side internet service provider is utilized, the communication can be made without need of striding between different providers, and thus the service quality (i.e., Qos and packet delay) can be readily guaranteed.

Moreover, in the type of execution on personal computer, communication can be made conveniently by merely click operating the icon.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A telephone communication system comprising
    a public network,
    a specific internet service provider (ISP) network, and
    a plurality of telephone sets accommodated in the public network,
    wherein a calling telephone set, which is a subscriber to the specific ISP network, provides connection point data specific to said specific ISP network for making internet service telephone communication to a called telephone set, said connection point data provided by using the public network, the called telephone set receiving the connection point data from the public network and connecting itself to the specific ISP network according to the connection point data, and the calling telephone set connecting itself to the specific ISP network, wherein said called and calling party are connected for making said internet service telephone communication using the same specific ISP network.

2. The telephone communication system according to claim 1, wherein functions of each telephone set are executed on a personal computer.

3. The telephone communication system according to claim 1, wherein functions of each telephone set are executed with an IVR (interactive voice response) unit or a facsimile data server or a voice recognition dialer or a voice mail.

4. The telephone communication system according to claim 1, wherein each telephone set comprises:
    a ten-key unit having dial keys and a function key for indicating an internet telephone service;
    a display unit for displaying a call arrival notification and results of various processes in the telephone set;
    an accumulating unit for storing telephone number data and access identifier data of internet connection points to be connected by the calling and called sides;
    a voice codec to be started by a command for voice communication in the specific ISP network; and
    a telephone set control unit for detecting depressed push-buttons in the ten-key unit, obtaining the connection point data from the accumulating unit, sending out dial data and connection point data via the public network, starting the voice codec when the dialed side has been connected to the specific ISP network and, upon arrival of a call, retrieving the connection point data of the calling side, effecting connection to the specific ISP provider network by retrieving and referring to the accumulating unit according to the connection point data, and informing the calling side of the connection.

5. The telephone communication system according to claim 1, wherein each telephone set further comprises an encryption unit for permitting exchange of connection point data in terms of ciphers.

6. A telephone communication system comprising:
a public network,
specific internet service provider (ISP) network, and
a plurality of telephone sets accommodated in the public network,
wherein a calling telephone set, which is a subscriber to the specific ISP network, provides connection point data specific to said specific ISP network for making internet service telephone communication to a called telephone set, said connection point data provided by using the public network, the called telephone set receiving the connection point data from the public network and connecting itself to the specific ISP network according to the connection point data, and the calling telephone set connecting itself to the specific ISP network, the connection point data including an IP address in the specific ISP network and a telephone number of a point to be connected to the specific ISP network, wherein said called and calling party are connected for making said internet service telephone communication using the same specific ISP network.

7. The telephone communication system according to claim 6, wherein functions of each telephone set are executed on a personal computer.

8. The telephone communication system according to claim 6, wherein functions of each telephone set are executed with an IVR (interactive voice response) unit or a facsimile data server or a voice recognition dialer or a voice mail.

9. The telephone communication system according to claim 6, wherein each telephone set comprises:
a ten-key unit having dial keys and a function key for indicating an internet telephone service;
a display unit for displaying a call arrival notification and results of various processes in the telephone set;
an accumulating unit for storing telephone number data and access identifier data of internet connection points to be connected by the calling and called sides;
a voice codec to be started by a command for voice communication in the specific ISP network; and
a telephone set control unit for detecting depressed push-buttons in the ten-key unit, obtaining the connection point data from the accumulating unit, sending out dial data and connection point data via the public network, starting the voice codec when the dialed side has been connected to the specific ISP network and, upon arrival of a call, retrieving the connection point data of the calling side, effecting connection to the specific ISP network by retrieving and referring to the accumulating unit according to the connection point data, and informing the calling side of the connection.

10. The telephone communication system according to claim 6, wherein each telephone set further comprises an encryption unit for permitting exchange of connection point data in terms of ciphers.

11. A telephone communication system comprising:
a public network,
a specific internet service provider (ISP) network, and
a plurality of telephone sets accommodated in the public network,
wherein a calling telephone set, which is a subscriber to the specific ISP network, provides connection point data specific to said specific ISP network for making internet service telephone communication to a called telephone set, said connection point data provided by using the public network, the called telephone set receiving the connection point data from the public network and connecting itself to the specific ISP network according to the connection point data, and the calling telephone set connecting itself to the specific ISP network, the connection point data including an IP address in the specific ISP network and a telephone number of a point to be connected to the specific ISP network, a push-button telephone set having various function keys being provided between each of the plurality of telephone sets and the public network with a function of sending out a call from each telephone set, wherein said called and calling party are connected for making said internet service telephone communication using the same specific ISP network.

12. The telephone communication system according to claim 3, wherein functions of each telephone set are executed on a personal computer.

13. The telephone communication system according to claim 11, wherein functions of each telephone set are executed with an IVR (interactive voice response) unit or a facsimile data server or a voice recognition dialer or a voice mail.

14. The telephone communication system according to claim 11, wherein each telephone set comprises:
a ten-key unit having dial keys and a function key for indicating an internet telephone service;
a display unit for displaying a call arrival notification and results of various processes in the telephone set;
an accumulating unit for storing telephone number data and access identifier data of internet connection points to be connected by the calling and called sides;
a voice codec to be started by a command for voice communication in the specific ISP network; and
a telephone set control unit for detecting depressed push-buttons in the ten-key unit, obtaining the connection point data from the accumulating unit, sending out dial data and connection point data via the public network, starting the voice codec when the dialed side has been connected to the specific ISP network and, upon arrival of a call, retrieving the connection point data of the calling side, effecting connection to the specific ISP network by retrieving and referring to the accumulating unit according to the connection point data, and informing the calling side of the connection.

15. The telephone communication system according to claim 11, wherein each telephone set further comprises an encryption unit for permitting exchange of connection point data in terms of ciphers.

16. An internet communication method comprising steps of:
providing, by a calling telephone set that is a subscriber to a specific internet service provider (ISP) network, connection point data, specific to said specific ISP, for making internet service telephone communication to a called telephone set, said connection point data being transmitted using a public network, the called telephone set receiving the connection point data from the public network and connecting to the specific ISP network on the basis of the connection point data, and the calling telephone set connecting to the specific ISP network;

wherein said called and calling party are connected for making said internet service telephone communication using the same specific ISP network.

17. An internet communication method comprising steps of:

providing, by a calling telephone set that is a subscriber to a specific internet service provider (ISP) network, connection point data for making internet service telephone communication to a called telephone set, said connection point data being specific to said specific ISP and being transmitted using a public network, the called telephone set receiving the connection point data from the public network and connecting to the specific ISP network on the basis of the connection point data, and the calling telephone set connecting to the specific ISP network, the connection point data including an IP address in the specific ISP network and a telephone number of a point to be connected to the specific ISP network, wherein said called and calling party are connected for making said internet service telephone communication using the same specific ISP network.

18. An internet communication method comprising steps of:

providing, by a calling telephone set that is a subscriber to a specific internet service provider (ISP) network, connection point data for making internet service telephone communication to a called telephone set, said connection point data being specific to said specific ISP and being transmitted using a public network, the called telephone set receiving the connection point data from the public network and connecting to the specific ISP network on the basis of the connection point data, and the calling telephone set connecting to the specific ISP network, the connection point data including an IP address in the specific ISP network and a telephone number of a point to be connected to the specific ISP network, and a push-button telephone set having various function keys being provided between each of the plurality of telephone sets and the public network with a function of sending out a call from each telephone set wherein said called and calling party are connected for making said internet service telephone communication using the same specific ISP network.

* * * * *